(12) United States Patent
Nagalla et al.

(10) Patent No.: US 12,084,199 B2
(45) Date of Patent: Sep. 10, 2024

(54) DYNAMIC AIRCRAFT-SPECIFIC GRAPHICAL USER INTERFACES

(71) Applicant: OneSky Flight LLC, Richmond Heights, OH (US)

(72) Inventors: Durga Nagalla, Richmond Heights, OH (US); Brian Koluder, Richmond Heights, OH (US); Michael Detrick, Richmond Heights, OH (US)

(73) Assignee: OneSky Flight LLC, Richmond Heights, OH (US)

( * ) Notice: Subject to any disclaimer, the term of this patent is extended or adjusted under 35 U.S.C. 154(b) by 0 days.

(21) Appl. No.: 18/087,558

(22) Filed: Dec. 22, 2022

(65) Prior Publication Data
US 2023/0202674 A1  Jun. 29, 2023

Related U.S. Application Data

(60) Provisional application No. 63/293,606, filed on Dec. 23, 2021.

(51) Int. Cl.
*G06F 3/0481* (2022.01)
*B64D 45/00* (2006.01)

(52) U.S. Cl.
CPC ........... *B64D 45/00* (2013.01); *G06F 3/0481* (2013.01)

(58) Field of Classification Search
CPC ............................. B64D 45/00; G06F 3/0481
See application file for complete search history.

(56) References Cited

U.S. PATENT DOCUMENTS

| | | | |
|---|---|---|---|
| 9,734,722 B1* | 8/2017 | Markey | G08G 5/0013 |
| 10,778,899 B2* | 9/2020 | Sato | G06V 20/13 |
| 2005/0278753 A1* | 12/2005 | Brady, Jr. | H04L 67/12 |
| | | | 725/77 |
| 2009/0094257 A1* | 4/2009 | Nissen | G06F 16/245 |
| 2012/0232791 A1* | 9/2012 | Sterkel | H04H 20/62 |
| | | | 701/454 |
| 2018/0352041 A1* | 12/2018 | Tasdemiroglu | H04W 4/21 |
| 2020/0307795 A1* | 10/2020 | Jackson | G06F 3/04845 |
| 2022/0349719 A1* | 11/2022 | Brewington | G01C 21/30 |

* cited by examiner

*Primary Examiner* — Haoshian Shih
(74) *Attorney, Agent, or Firm* — Foley & Lardner LLP (57) ABSTRACT

Disclosed herein are methods and systems for customizing graphical user interfaces based on user preferences and aircraft-specific information. In one example, a method comprises continuously monitoring, by a processor, a location of an aircraft using a sensor on the aircraft; identifying, by the processor, a trajectory of the aircraft based on the continuous monitoring of the location of the aircraft; identifying, by the processor, an altitude of the aircraft; and determining, by the processor, one or more landmarks visible from the aircraft based on the identified altitude, location, and trajectory of the aircraft; and presenting, by the processor, a page having one or more graphical indications of the one or more landmarks visible from the aircraft.

20 Claims, 8 Drawing Sheets

DYNAMIC AIRCRAFT-SPECIFIC GRAPHICAL USER INTERFACES

CROSS-REFERENCE TO RELATED APPLICATIONS

This application claims priority to U.S. Provisional Patent Application No. 63/293,606, filed Dec. 23, 2021, which is incorporated by reference in its entirety for all purposes.

TECHNICAL FIELD

This application relates generally to dynamic and interactive graphical user interfaces for an aircraft.

BACKGROUND

Landmark identification for passengers on board an aircraft is currently performed by the flight crew. Typically, a pilot or a flight attendant notifies the passengers regarding the location of a well-known landmark when it is visible and may describe the landmark so that the passengers can look outside of the aircraft and see the landmark. This process is outdated and highly dependent on the flight crew's availability and personal knowledge. To improve this process, some aircraft carriers utilize software solutions to digitally represent landmarks (located near the aircraft) for the passengers. However, conventional software solutions provide a static view of all landmarks near the aircraft where the list is not customized in accordance with user preferences, aircraft trajectory, or visibility of the landmarks themselves. Furthermore, conventional software solutions are inadequate because they do not provide any description of the landmarks.

SUMMARY

For the aforementioned reasons, there is a desire to present a graphical user interface (GUI) to show landmarks near an aircraft or within the aircraft's flight path to end-users (e.g., passengers and/or flight crew) where the GUI is dynamically customized based on aircraft travel trajectory, user preferences, and landmark visibility. There is also a desire for a GUI that provides adequate description for different landmarks. There is also a desire to present a GUI that can update itself in accordance with the aircraft's movements and flight path/trajectory (in real-time or near real-time). There is also a desire to present a GUI that can present images of interest to an end-user while onboard the aircraft.

The methods and systems described herein allow a processor or a server (referred to herein as the analytics server) to customize a GUI that is presented on an aircraft's electronic devices to display to passengers/end-users landmarks that are visible in accordance with the aircraft's travel trajectory (e.g., velocity/speed, direction, and/or altitude) and/or user preferences. The analytics server can update the GUI in accordance with the aircraft's latest location, such that new landmarks are displayed and landmarks that are no longer visible from the aircraft are removed. The analytics server can also access a data repository storing an end-user's images (e.g., a passenger's mobile device or cloud storage), identify images that were captured near the aircraft's current location (or within the flight path), and display the images and/or description(s) of the images.

In an embodiment, a method comprises continuously monitoring, by a processor, a location of an aircraft using a sensor on the aircraft; identifying, by the processor, a trajectory of the aircraft based on the continuous monitoring of the location of the aircraft; identifying, by the processor, an altitude of the aircraft; determining, by the processor, one or more landmarks visible from the aircraft based on the identified altitude, location, and trajectory of the aircraft; and presenting, by the processor, a page having one or more graphical indications of the one or more landmarks visible from the aircraft.

In another embodiment, a server comprising a processor and a non-transitory computer-readable medium containing instructions that, when executed by the processor causes the processor to perform operations comprising: continuously monitoring a location of an aircraft using a sensor on the aircraft; identifying a trajectory of the aircraft based on the continuous monitoring of the location of the aircraft; identifying an altitude of the aircraft; and determining one or more landmarks visible from the aircraft based on the identified altitude, location, and trajectory of the aircraft; and presenting a page having one or more graphical indications of the one or more landmarks visible from the aircraft.

In yet another embodiment, a computer system comprises an electronic device configured to present one or more pages, and a server in communication with the electronic device, the server configured to continuously monitor a location of an aircraft using a sensor on the aircraft; identify a trajectory of the aircraft based on the continuous monitoring of the location of the aircraft; identify an altitude of the aircraft; and determine one or more landmarks visible from the aircraft based on the identified altitude, location, and trajectory of the aircraft; and present, on the electronic device, a page having one or more graphical indications of the one or more landmarks visible from the aircraft.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and, together with the specification, explain the invention.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 1:
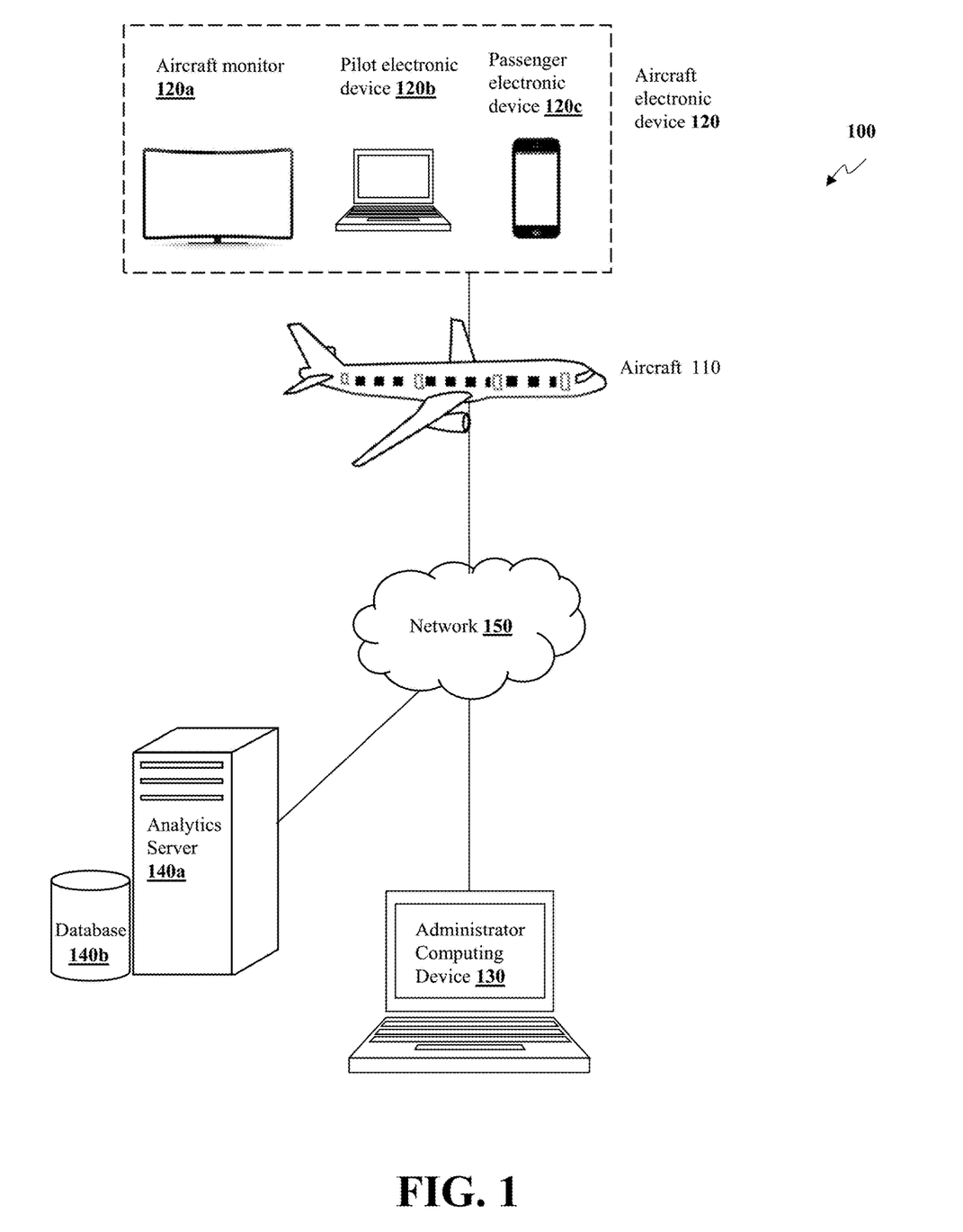
FIG. 1 illustrates a computer system for dynamic aircraft-specific GUI generation, in accordance with an embodiment.

FIG. 1 illustrates various components of a system 100 for dynamic aircraft-specific GUI generation, in accordance with an embodiment. The system 100 provides a non-limiting example of a computer system having various features that can be utilized to dynamically revise a GUI associated with an aircraft (e.g., displayed on the aircraft's monitor or accessed via an application executing on an electronic device on the aircraft, for example, a passenger's or a pilot's mobile phone).

The system 100 may include an aircraft 110, aircraft electronic devices 120a-c (collectively aircraft electronic devices 120), an administrator computing device 130, an analytics server 140a, database 140b, and a network 150. The network 150 may include, but is not limited to, a private or public local area network, wireless local area network, metropolitan area network, wide-area network, or the Internet. The network 150 may further include both wired and wireless communications according to one or more standards via one or more transport mediums. Communication over the network 150 is in accordance with various communication protocols such as transmission control protocol and internet protocol, user datagram protocol, and Institute of Electrical and Electronics Engineers communication protocols. The network 150 may further include wireless communications according to Bluetooth specification sets, or another standard or proprietary wireless communication protocol. The network 150 may further include communications over a cellular network, including, for example, a global system for mobile communications, code division multiple access, and enhanced data for a global evolution network.

As used herein, an aircraft electronic device may be any electronic device that is operated on the aircraft 110 and is configured to output content in accordance with instructions received from the analytics server 140a. Therefore, the aircraft electronic device 120 may be operated by anyone onboard the aircraft 110 (e.g., passenger electronic device 120c or pilot electronic device 120b). In some configurations, the GUI(s) discussed herein may be presented on an aircraft display(s) 120a. The aircraft electronic devices 120 may execute an application to access one or more GUIs provided by the analytics server 140a. An example of a GUI may be a website accessible through a browser application or a mobile application executing on the aircraft electronic devices 120.

The aircraft electronic devices 120 may execute a browser application and access a website hosted (or at least partially controlled by) the analytics server 140a. In another example, the analytics server 140a may host/generate an application accessible by the aircraft electronic devices 120. The methods and systems described herein apply to generating various graphical elements that are customized to an end-user (e.g., passenger or flight crew) operating the aircraft electronic devices 120. These graphical elements may be embedded into other graphical elements and/or applications, such as embedded within a website or any other application. Therefore, the methods and systems described herein can be used to customize GUIs that are not necessarily hosted by the analytics server 140a. For instance, a third-party web server (not shown here) may use the analytics server 140a (executing the methods described herein) to customize one or more GUIs.

The system 100 may operate in a cloud-computing environment where the aircraft electronic devices 120 may be cloud-optimized. The GUIs and elements generated by the analytics server 140a (e.g., services provided by the analytics server 140a) may be stored and executed on a remote cloud-based analytics server 140a accessed over a network cloud.

The analytics server 140a may be any computing device capable of performing the actions described herein. For instance, the analytics server 140a may include a processing unit and a non-transitory machine-readable storage medium. The processing unit may include a processor with a computer-readable medium, such as random access memory coupled to the processor. The analytics server 140a may be executing algorithms or computer-executable program instructions, which may be executed by a single processor or multiple processors in a distributed configuration. The analytics server 140a may be configured to interact with one or more software modules of the same or a different type operating within the system 100.

Non-limiting examples of the processor may include a microprocessor, an application-specific integrated circuit, and a field programmable object array, among others. The analytics server 140a is capable of executing data processing tasks, data analysis tasks, and valuation tasks. Non-limiting examples of the analytics server 140a may include a desktop computer, a server computer, a laptop computer, a tablet computer, and the like. For ease of explanation, FIG. 1 depicts a single server computing device functioning as the analytics server 140a. However, some embodiments may include a plurality of server computing devices capable of performing various tasks described herein.

The analytics server 140a may utilize a database, such as the database 140b, to store and/or retrieve various data described herein. For instance, the analytics server 140a may store different data corresponding to different landmarks and/or their scaling information (e.g., size) within the database 140b. The database 140b may also include data associated with different users operating the aircraft electronic devices 120 (e.g., name, age, and other demographic data) and customization information (e.g., preferences and/or thresholds).

The aircraft electronic devices 120 may represent any computing device including a processing unit. The processing unit may execute any software application or a web browser application that accesses or receives data records provided by the analytics server 140a. The processing unit may include a processor with a computer-readable medium, such as random access memory coupled to the processor. The aircraft electronic devices 120 may be running algorithms or computer-executable program instructions, which may be executed by a single processor or multiple processors in a distributed configuration. The aircraft electronic devices 120 may interact with one or more software modules of the same or a different type operating within the system 100.

Non-limiting examples of the processor may include a microprocessor, an application-specific integrated circuit, and a field programmable object array, among others. Non-limiting examples of the aircraft electronic devices 120 may include a server computer, a workstation computer, a tablet device, and a mobile device (e.g., smartphone). An end-user may operate the aircraft electronic devices 120.

The database 140b may be a data repository configured to store data associated with user preferences, attributes associated with various graphical elements to be generated by the analytics server 140a, or other computing devices. The database 140b may store other user data, such as user preferences, user profile, and various other customization attributes. In yet another example, the database 140b may store aircraft-specific data or route-specific data. For instance, various thresholds and variables discussed herein (e.g., landmark lists, visibility thresholds, and/or distances) can be stored within the database 140b. The database 140b may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the database 140b is shown as a separate computing feature, the database 140b may be a part of a computing environment that includes the analytics server 140a.

The aircraft 110 may be any machine capable of flying, such as an airplane, helicopter. The aircraft 110 may include various sensors configured to gauge the aircraft's movements, such as location-tracking sensors (e.g., ADB-S sensors, radars, GPS-tracking devices) and altimeters. These sensors may be in direct or indirect communication with the analytics server 140a. Using data retrieved from these sensors, the analytics server 140a may track the aircraft 110 and identify its movements (e.g., direction, velocity/speed, altitude, and trajectory). As described herein, the analytics server 140a may use this information to customize one or more GUIs described herein. The analytics server 140a may also use this information to estimate a projected location for the aircraft 110. For instance, the analytics server 140a may use the aircraft 110's speed/velocity and direction and extrapolate a projected location for the aircraft 110 (sometimes also based on the previously known location of the aircraft 110). In calculating a trajectory of an aircraft, the analytics server 140a may use latitude, longitude, altitude, and time. Some calculations of trajectory may account for airspeed, acceleration, pitch, and descent/climb/level flying.

The aircraft 110 may also be equipped with various electronic devices, such as aircraft electronic devices 120a (e.g., a monitor of the aircraft 110). The analytics server 140a may use the methods discussed herein to display various GUIs on the aircraft 110's electronic devices.

Figure 5:
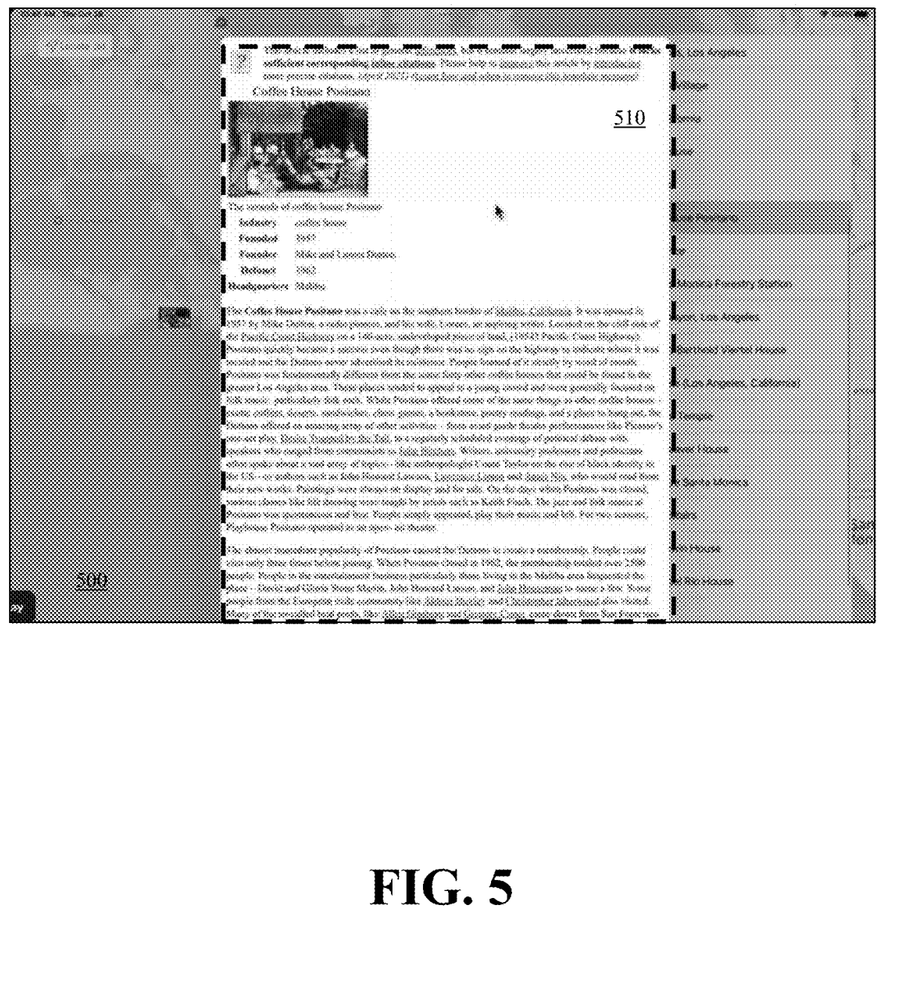
Figure 6:
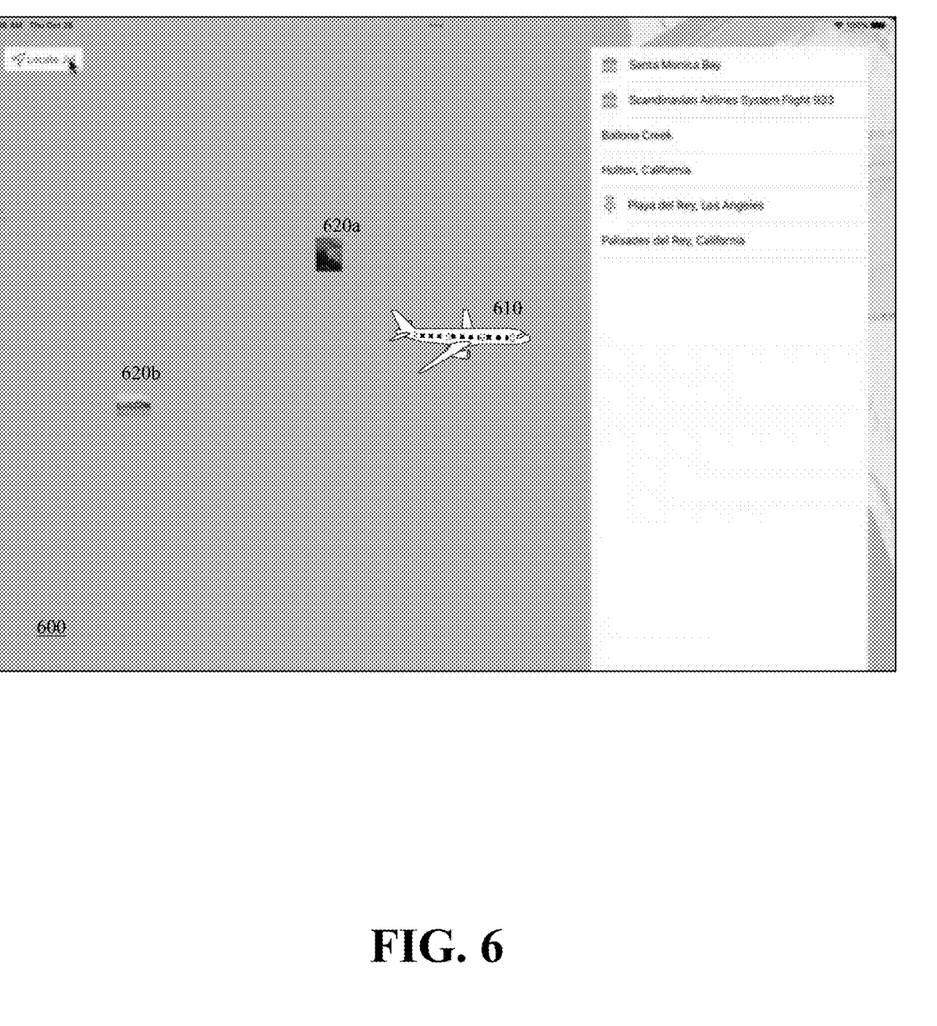
Figure 7:
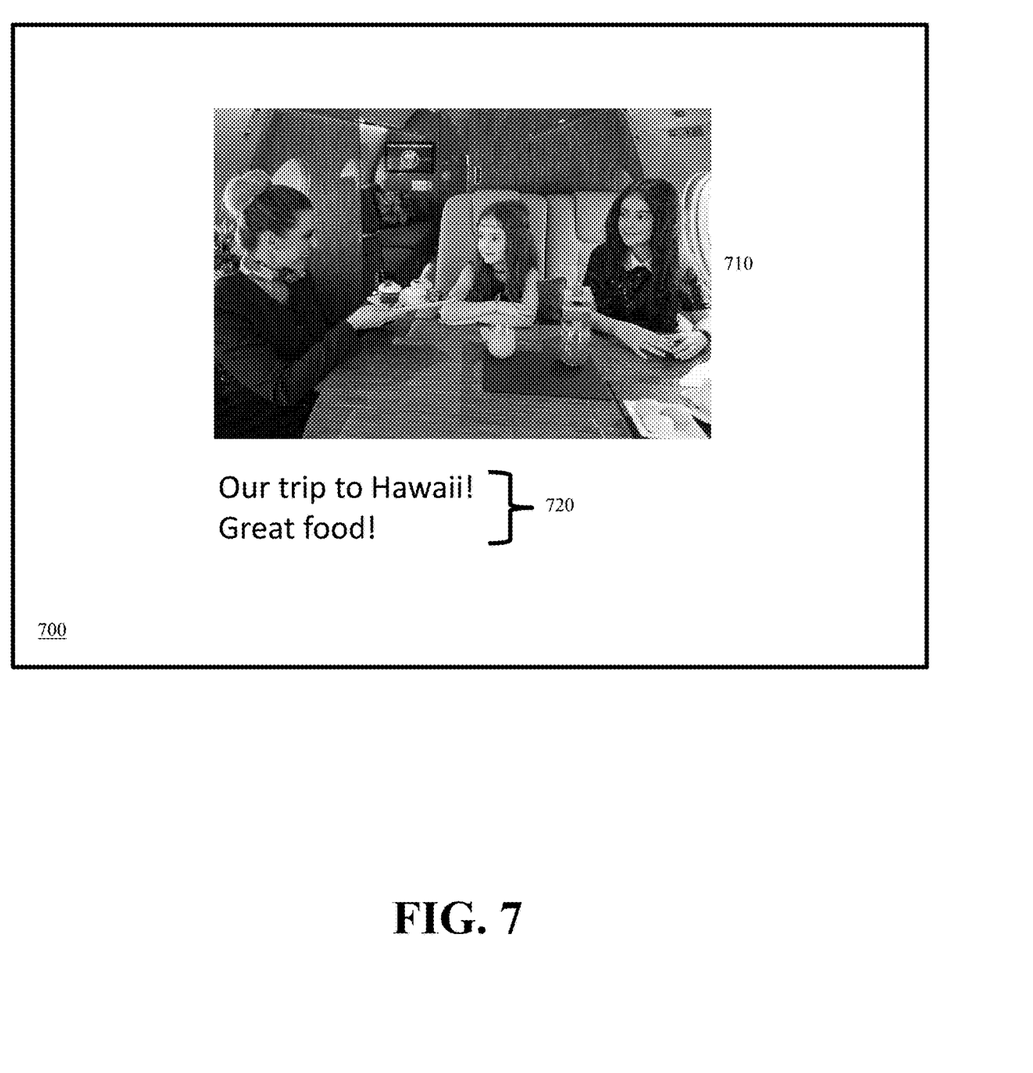

In operation, an end-user (e.g., a passenger) may access an application executing on their mobile device (passenger electronic device 120c) to view various landmarks and/or images of interest while onboard the aircraft 110. Using the methods discussed herein, the analytics server 140a may present a GUI on the passenger electronic device 120c that shows graphical indications for different landmarks that are visible from the aircraft 110, as depicted in FIGS. 3-6. In some embodiments, the GUI may also include various images of interest, as depicted in FIGS. 7-8.

In an embodiment, the methods discussed herein can be performed by one or more of the aircraft electronic devices 120. For instance, one or more of the functionalities discussed herein can be performed locally on the passenger electronic device 120c. In that embodiment, the analytics server 140a may perform various tasks discussed herein (e.g., analyze a flight path and flight plan). The analytics server 140a may then generate one or more of the GUIs discussed herein and preload the content onto the passenger electronic device 120c prior to the aircraft 110 taking off. While on board the flight, the passenger electronic device 120c may then retrieve the information loaded by the analytics server 140a and display one or more of the GUIs discussed herein. Therefore, the passenger electronic device 120c would be not be calling the analytics server 140a for the content itself as the passenger electronic device 120c would act as the analytics server 140a in terms of what content would be shown based on aircraft location. In yet another configuration, additional functionality (or even all of the functionality) of the analytics server can be performed by the passenger electronic device.

Figure 2A:
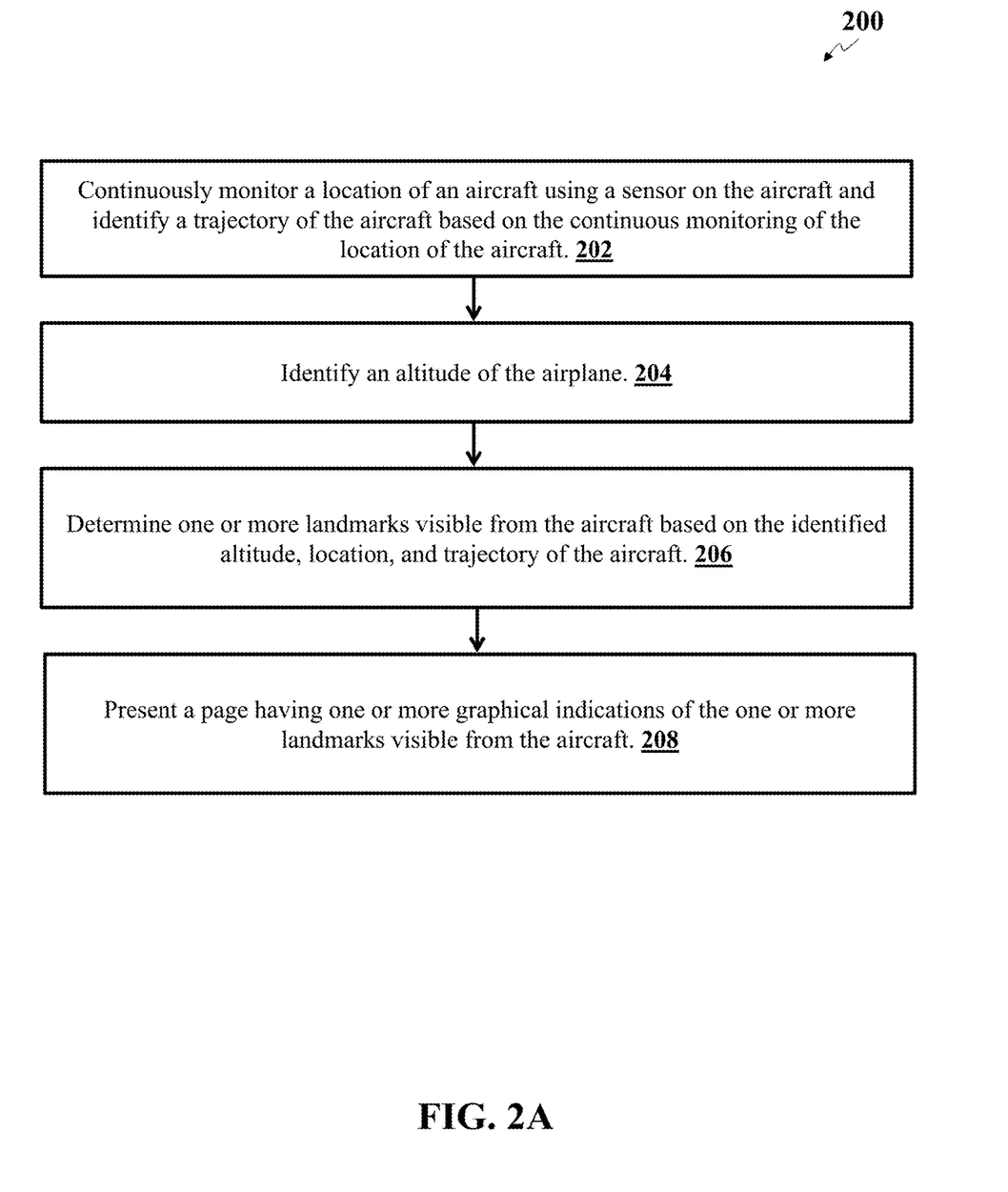
FIG. 2A illustrates a flowchart depicting operational steps for a dynamic aircraft-specific GUI generation, in accordance with an embodiment.

FIG. 2A illustrates a flowchart depicting operational steps for a dynamic aircraft-specific GUI generation, in accordance with an embodiment. The method 200 describes how a server, such as the analytics server described in FIG. 1, displays various customer-specific (and sometimes interactive) graphical elements. Even though the method 200 is described as being executed by the analytics server, the method 200 can be executed by any server and/or locally within a user's computing device or as a browser extension.

At step 202, the analytics server may continuously monitor a location of an aircraft using a sensor on the aircraft and identify a trajectory of the aircraft based on the continuous monitoring of the location of the aircraft. The analytics server may continuously or periodically monitor an aircraft's location. The analytics server may use a variety of methods to identify the aircraft's location. In an embodiment, the analytics server may communicate with a location-tracking sensor associated with the aircraft. For instance, the aircraft may have a sensor that uses a variety of location tracking methods (e.g., GPS) to identify the location coordinates of the aircraft at any given moment.

Additionally or alternatively, the analytics server may use one or more sensors that indicate directionality, velocity/speed, and other moving attributes of the aircraft. While these sensors are typically used by pilots to navigate the aircraft, the analytics server may use the data retrieved from these sensors to predict a trajectory for the aircraft.

As a non-limiting example, the aircraft may include an Automatic Dependent Surveillance-Broadcast (ADS-B) sensor. Using the ADS-B surveillance technology, the aircraft itself may determine the aircraft's position via satellite navigation or other sensors and periodically broadcast the aircraft's position to the analytics server. In some configurations, the data retrieved from the aircraft's sensors may include a time delay. For instance, data transmitted by the ADS-B sensors may be received by air traffic control servers and may then be received by the analytics server (e.g., indirectly via the air traffic control servers or any third-party data aggregator or monitor). To predict or estimate an accurate location or trajectory of the aircraft, the analytics server may use previous readings to predict a location and/or velocity for the aircraft (e.g., forecast the aircraft's previously known location to predict where the aircraft will be in five minutes). For instance, using the flight plan, last known location, and last known (or real-time) velocity/speed of an aircraft, the analytics server may calculate a projected location of the aircraft. The analytics server may also evaluate one or more previous locations of the aircraft against its flight path to predict the aircraft's current location.

In another example, the analytics server may retrieve the aircraft's location from one or more trusted servers, such as servers associated with the Federal Aviation Administration (FAA).

As a result of periodically monitoring the aircraft's location, the analytics server may aggregate the location data and calculate a velocity/speed and a trajectory for the aircraft. For instance, using different locations associated with the aircraft and using the periodicity of location tracking, the analytics server may identify a velocity and trajectory associated with the aircraft. For instance, the analytics server may (within a reasonable degree of certainty due to certain technical challenges, such as delayed communication with a sensor) calculate a projected velocity associated with the aircraft. The analytics server may also determine a trajectory for the aircraft that indicates a direction of travel for the aircraft. The analytics server may use this information to estimate a location and/or altitude for the aircraft.

The analytics server may also utilize a pre-generated flight path associated with the aircraft. To comply with various rules and regulations, the aircraft may be required to provide a flight path before its flight. For instance, the aircraft (or an organization associated with the aircraft) may provide a flight path that includes an origination location and time, a destination location and time, and a projected flight path. The analytics server may then project a location and direction associated with the aircraft at different times during its flight. The analytics server may check the trajectory calculated via communicating with the aircraft's sensor against the calculated flight path of the aircraft.

At step 204, the analytics server may identify an altitude associated with the aircraft during its flight. The analytics server may communicate with one or more sensors associated with the aircraft to identify its altitude. For instance, the aircraft may include a barometric altimeter sensor that can communicate the aircraft's altitude to the analytics server.

At step 206, the analytics server may determine one or more landmarks that are visible from the aircraft based on the identified altitude, location, and trajectory of the aircraft. The analytics server may identify one or more relevant landmarks and other points of interest. As used herein, a landmark may refer to any object (whether man-made or naturally occurring) that marks a land boundary, such as a geological feature that can be seen or recognized by human observers. Non-limiting examples of landmarks may include national parks, well-known or popular structures (e.g., Statue of liberty or the Empire State Building), and the like.

Using the identified or calculated location, travel trajectory, and altitude of the aircraft, the analytics server may determine a list of landmarks associated with the aircraft. To do so, the analytics server may first query one or more data repositories to identify a list of landmarks within a visibility threshold associated with a location of the aircraft. The visibility threshold may be calculated based on a predefined distance threshold and the aircraft's altitude. The analytics server may also consider one or more additional factors when calculating the visibility.

Figure 2B:
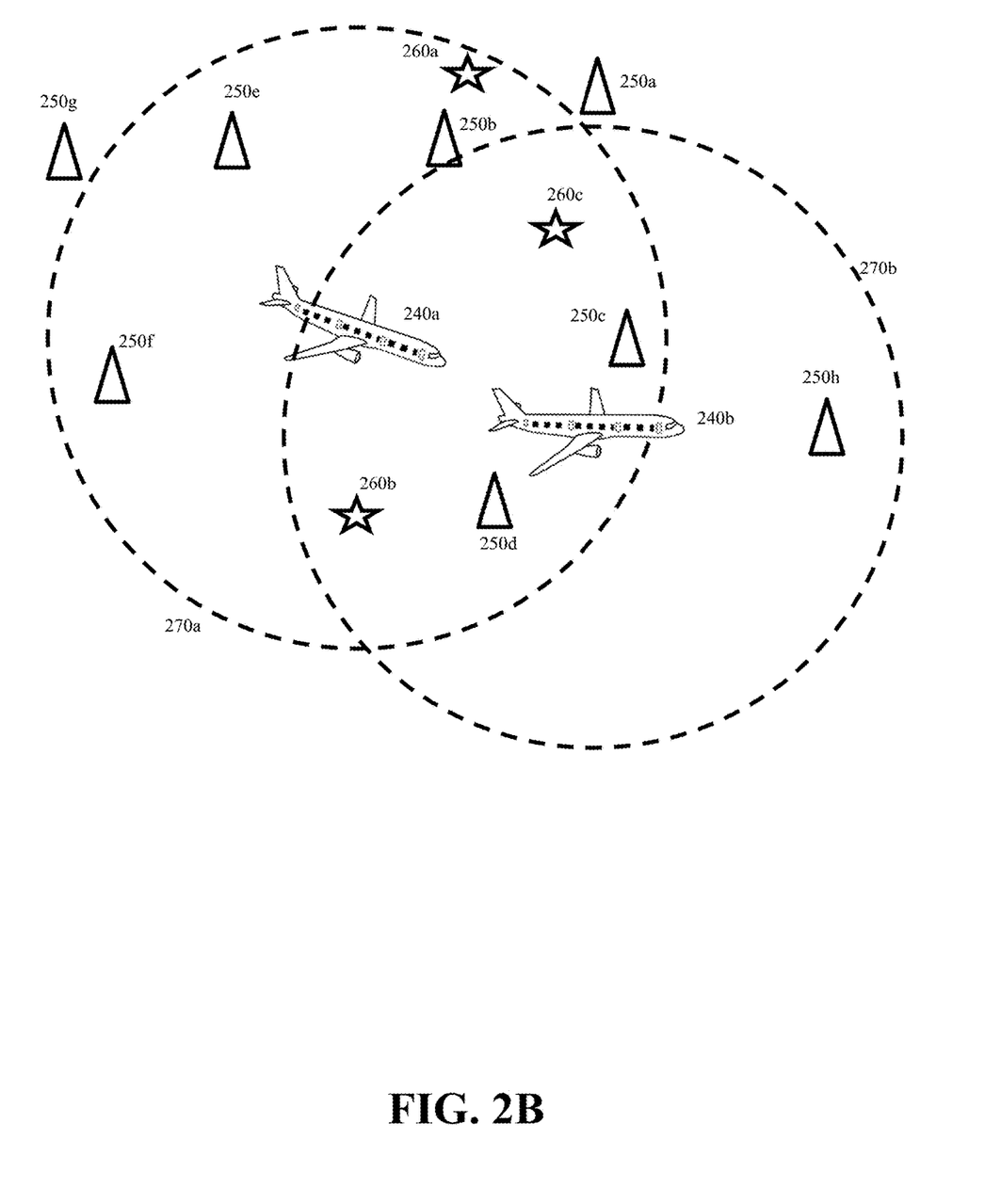
FIG. 2B illustrates a schematic illustration of landmarks and images of interest, in accordance with an embodiment.

After calculating the visibility threshold, the analytics server may query one or more data repositories and identify one or more landmarks that are visible from the aircraft. For instance, if the aircraft's trajectory indicates that the aircraft is traveling eastbound, the analytics server queries one or more data repositories to identify one or more landmarks that within a defined threshold (visibility threshold) to the east of the aircraft. This concept is depicted in FIG. 2B.

In some configurations, each landmark retrieved from one or more data repositories may include data indicating a scale feature associated with the landmark. Scale feature, as used herein, may refer to the visibility of a landmark from a particular altitude and/or distance. Therefore, scale feature data may depend on the landmark itself (e.g., size, color, and/or elevation). For instance, scale features may indicate that a building is tall and, as a result, the building is visible from one mile away. In contrast, scale features of another building (e.g., a shorter building) may indicate that the building is only visible from 200 feet away because the building is not tall. The analytics server uses each landmark's scale features to determine a list of landmarks visible from the aircraft. Therefore, a landmark must be within the visibility threshold of the aircraft and the landmark itself must be visible from a distance that corresponds to the distance between the landmark and the aircraft.

If scale features are not available (e.g., not stored within one or more data repositories), the analytics server may query dimensionality of the landmarks and may estimate the scale features using various computer modeling techniques, such as by applying a mathematical algorithm to width and/or length of the landmark.

In some configurations, the landmarks may be hardcoded to include a visibility value. For instance, data associated with a landmark may indicate that the landmark is visible from an altitude of 1000 feet from one mile away. The analytics server may generate an internal model that includes scale factors associated with different landmarks. For instance, when the analytics server identifies a landmark, the analytics server may check that landmark against an internal list of landmark scale factor data, which may include pre-generated visibility data.

To calculate the visibility threshold, the analytics server may first identify or retrieve a distance threshold. The distance threshold may have been previously set (e.g., a default distance set by a system administrator). The distance threshold may be a dynamic threshold that depends on a variety of factors. That is, the distance threshold may be different for different end-users and/or different flights. For instance, the distance threshold may be different for domestic flights and international flights. Furthermore, certain flight paths may be associated with a pre-configured threshold. For instance, a domestic flight (flight from Los Angeles to San Francisco) may have a shorter distance threshold than another flight (e.g., flight from Los Angeles to Japan).

The analytics server may query and retrieve (or identify) the distance threshold using one or more attributes of the flight. For instance, the analytics server may query one or more data repositories and determine that the distance threshold associated with a domestic flight from Los Angeles to Dallas is six miles.

The distance threshold can be customized by the end-user. In some configurations, the distance threshold may be received from the end-user for a particular flight. When the end-user accesses the electronic platform provided by the analytics server, the end-user may enter a distance threshold using one or more input elements provided by the analytics server (e.g., drop-down menu or other input fields). Additionally or alternatively, the end-user may change the distance threshold while viewing one or more GUIs discussed herein. In another example, an end-user may have previously identified a preferred distance threshold and saved the distance threshold within a user profile. The end-user may also input various rules associated with the distance threshold (e.g., distance threshold of six miles for domestic flights and 10 miles for international flights). In those embodiments, the analytics server may query a user profile to identify the distance threshold and apply any rules (if any) set by the end-user.

The analytics server may use the distance threshold and aircraft's altitude to calculate the visibility thresholds. As altitude impacts visibility, the analytics server may increase or decrease the distance threshold to identify the visibility threshold. The analytics server may retrieve a set of pre-generated rules to identify the visibility threshold in accordance with the distance threshold and the aircraft's altitude. The pre-generated rules may include one or more mathematical algorithms or formulas that identify how the visibility threshold should be calculated based on the distance threshold and the altitude. For instance, the rules may increase or decrease the distance threshold in accordance with the aircraft's altitude. Alternatively, the analytics server may not always use the altitude when calculating the visibility threshold. Therefore, in some embodiments, the visibility threshold is the same as the distance threshold.

The analytics server may also consider other factors when calculating the visibility threshold, such as the weather condition. As weather conditions impact visibility, the analytics server may increase or decrease the visibility threshold in accordance with the weather conditions around the aircraft location. For instance, on foggy or cloudy days, the analytics server may decrease the visibility threshold (or eliminate the visibility threshold because, for example, the aircraft is detected to be above clouds). On sunny days, the analytics server may increase the visibility threshold.

Using the visibility threshold, the analytics server may identify a set of landmarks near the aircraft. The analytics server may then filter the list in accordance with the aircraft's trajectory. As described above, the analytics server may identify the aircraft's trajectory at any given time. In some configurations, the analytics server may filter the list of identified landmarks to the landmarks that are within the flight path or in the direction towards which the aircraft is heading. For instance, if the analytics server identifies that the aircraft is traveling from east to west, the analytics server may only consider the landmarks that are located to the west of the aircraft at the time of calculation. The analytics server may also filter the identified list based on each landmark's scaling factor.

The analytics server may perform the method 200 periodically and may update the list of landmarks in real-time or in near real-time. For instance, the analytics server may update the list of visible landmarks every 5 seconds or every 1 minute. The periodicity of the analytics server updating the list of landmarks may be a set default rate identified by a system administrator or an end-user.

Furthermore, the visibility threshold itself may also be customized by the end-user. For instance, the end-user may indicate (e.g., using one or more input elements of a GUI provided by the analytics server) that the end-user is interested in seeing landmarks that are within 15 miles of the aircraft at any time. This identified threshold may override the visibility calculations discussed herein. For instance, the analytics server may use the 15-mile radius as the threshold and may not consider the direction of the aircraft and/or the altitude of the aircraft.

The analytics server may apply the same method to identify images of interest for the end-user. For instance, the analytics server may filter all images stored on the end user's phone (or otherwise identified by the end-user) using the methods discussed herein. For instance, the analytics server may retrieve a location associated with each image saved within the end-user's mobile device and determine images having locations that are within the distance threshold and/or the visibility threshold. In some configurations, the visibility threshold may be different for the landmarks than the images of interest. For instance, the end-user may have indicated that they are interested in a wider radius when identifying images of interest than when identifying landmarks.

As used herein an image of interest may refer to any previously saved media elements (e.g., image, video, or an audio file) having one or more attributes that match one or more criteria discussed herein. For instance, a point of interest may refer to an image captured by an end-user where the image includes metadata that may indicate a location where the image was captured. In some configurations, the location associated with the image may be identified using vision processing methods. For instance, if an image does not include metadata indicating where the image was taken, the analytics server may execute one or more models that use computer vision learning to identify an approximate location of the image (if possible). For instance, the image may include a well-known monument (e.g., Statue of liberty). Using one or more computer models, the analytics server may determine that the image was taken at Liberty Island in New York.

The analytics server may use the method 200 to identify images of interest with locations that fit within the aircraft's travel path or trajectory.

FIG. 2B illustrates a schematic of one or more landmarks and images of interest near an aircraft and whether the one or more landmarks (and/or images of interest) are selected by the analytics server.

FIG. 2B depicts various landmarks 250 and images of interest 260 that are within the visibility threshold of the aircraft 240 (e.g., as the aircraft 240 moves from position to 240a to 240b).

As the aircraft 240 moves, the analytics server may periodically or continuously use one or more visibility thresholds to identify relevant landmarks and/or images of interest. The identified landmarks and/or images of interest may represent a series of landmarks that are visible to a passenger or flight crew onboard the aircraft 240. The image is of interest, though not visible, represents images taken at a location that would have been or would be visible to a passenger or flight crew onboard the aircraft 240. The analytics server may analyze the landmarks 250a-h (collectively referred to as the landmarks 250) and/or images of interest 260a-c (collectively referred to as the images of interest 260).

When the aircraft 240 is at the location 240a, the analytics server may apply visibility threshold 270a to analyze the landmarks 250 and images of interest 260. That is, the analytics server may identify a list of landmarks and/or images of interest that are visible to passengers onboard the aircraft 240 (at the location 240a). As depicted, the visibility threshold 270a includes the landmarks 250e, 250b, 250c, 250d, and 250f. As depicted, the analytics server may not consider the landmarks 250a, 250g, 250h.

In another configuration, the analytics server may present landmark 250h upon determining the trajectory of the aircraft 240 is heading in that direction, even though the landmark 250h is not currently within view of an end-user. The landmark 250h may be display, loaded into a cache memory, or included in a notification to an end-user. In one embodiment, the landmarks in the trajectory of the aircraft 240 may be shown if within a certain threshold distance or time.

Alternatively, the analytics server may consider a direction of travel associated with the aircraft 240 when identifying the pertinent landmarks and/or images of interest. For instance, when considering the direction of travel, the analytics server may exclude the landmarks 250e and 250f when identifying the landmarks for the aircraft 240 at the location 240a. This is because the aircraft 240 is moving from the location 240a towards the location 240b. Therefore, the landmarks 250e and 250f are located behind the aircraft 240 at the location 240a.

When the aircraft 240 is at the location 240b, the analytics server may use the visibility threshold 270b to identify a new list of landmarks and/or images of interest that are visible to passengers and/or flight crew of the aircraft 240. At the location 240b, the analytics server identifies the landmarks 250c, 250d, 250h and images of interest 260b-c. As a result, when the aircraft 240 moves from the location 240a to the location 240b, the analytics server may revise a page so that it includes fewer landmarks and/or images of interest. Specifically, at the location 240b, the analytics server may only display landmarks and/or images of interest that are within the visibility threshold 270b.

FIG. 2B depicts the visibility threshold 270a and 270b as equal (e.g., each visibility threshold is a radius of the same distance around the aircraft 240 at different locations). Alternatively, for different locations, the analytics server may use different visibility thresholds. For instance, as the aircraft 240 moves to the location 240b from the location 240a, the analytics server may revise the visibility threshold. Therefore, the visibility threshold may not always remain a constant value. In another example, the aircraft 240 may go above clouds when it reaches the location 240b. As a result, the analytics server may decrease the visibility threshold 270b to zero.

Furthermore, FIG. 2B depicts that the visibility threshold 270a and 270b are used for both landmarks 250 and the images of interest 260. Alternatively, the analytics server may use a different visibility threshold when identifying landmarks that are visible to passengers and/flight crew of the aircraft 240 than when identifying images of interest.

Additionally, the analytics server may use the aircraft's position to identify which side of the aircraft the landmark or image of interest is located. For instance, the analytics server may determine that the landmark 250c is located on the left side of the aircraft when the aircraft is at the location 240b but in front of the aircraft at the location 240a. Using this data, the analytics server may prompt the end-user to easily identify the landmark in accordance with the aircraft's location (e.g., "look outside to your left" or "You should be able to see the Statue of Liberty on your right side").

Referring back to FIG. 2, at step 208, the analytics server may present a page having one or more graphical indications of the one or more landmarks visible from the aircraft. After identifying a list of landmarks that are visible from the aircraft (step 206), the analytics server may present a page that includes a GUI that presents various graphical indicators each corresponding to an identified landmark and/or image of interest. When a user interacts with a graphical indicator, the analytics server may display additional information. For instance, the analytics server may direct the user or the user's electronic device to a new page or may revise the existing page to include additional information regarding the landmark or the image of interest with which the end-user has interacted.

The additional information may include any additional data that is associated with the landmark or the image of interest with which the end-user has interacted. In a non-limiting example, additional information may include additional images or other media elements, such as a video describing or depicting the landmark with which the end-user has interacted. In another non-limiting example, the analytics server may query a data repository using one or more key terms associated with the landmark with which the end-user has interacted. The analytics server may then display the additional data, which may include text associated with the landmark. For instance, the analytics server may query an encyclopedia data source and may retrieve various corpus of data (e.g., text files) that describe the landmark with which the end-user has interacted. The analytics server may display the retrieved data as additional information.

The additional information is not limited to data that is visually presented. In some embodiments, the additional information may be presented as an audio file or a haptic notification. For instance, an audio file describing a particular landmark may be outputted when the end-user interacts with an indicator that corresponds to that particular landmark. The analytics server may cause one or more electronic devices of an aircraft to output the audio file that corresponds to the identified landmarks and/or images of interest.

Referring now to FIGS. 3-8, various pages displayed and/or revised by the analytics server in accordance with the methods and systems described herein are illustrated. The pages depicted within the FIGS. 3-8 may be displayed on any electronic device associated with an aircraft. For instance, these pages may be displayed on a mobile application executed on a passenger or a flight crew's laptop, mobile phone, or any other electronic device capable of accessing the mobile application. In another embodiment, the pages depicted and discussed herein can be displayed on a monitor of an aircraft that has been integrated and is functionally operated by a processor of the aircraft. Therefore, no limitation of the electronic device displaying these pages is intended. The methods and systems described herein can be implemented while the aircraft is in flight and/or stationary. For instance, the page 300 is an example of a GUI generated by the analytics server when the aircraft is not in flight. Alternatively, the page 400 depicts a GUI generated by the analytics server where the aircraft is in flight.

A landmark may be visible from an altitude of 10,000 feet but not from an altitude of 30,000 feet. But an end-user may desire to see that landmark even though it is not visible from the current altitude of 30,000 feet. The analytics server may provide the end-users with the option of selecting an altitude that is used in the visibility threshold. For instance, instead of displaying landmarks that are visible based on the aircraft's current (actual) altitude, the analytics server may allow for selection of different altitudes. The analytics server may then change the visibility threshold (and as a result, the available landmarks and/or the images of interest that are visible and presented to the end-user) based on a selected altitude. For instance, the analytics server may display landmarks visible at a first altitude for the end-user. Additionally, the analytics server may display an input element (e.g., toggle or a drop down menu) allowing the user to select a second altitude. When the analytics server determines that the end-user has selected a different altitude, the analytics server may revise the GUIs discussed herein accordingly. Upon selection of the second altitude (e.g., a lower altitude), the analytics server may present additional landmarks that are now visible with the second altitude.

In some configurations, the analytics server may analyze an aircraft's flight plan and may display a GUI (not shown here) that includes an aggregate list (visually or textually) of all the landmarks for a particular flight. For instance, the analytics server may display a GUI that includes the flight path and various landmarks that would be visible during the flight. This GUI can be displayed before the flight, at any point during the flight, and/or after the flight has landed. The GUI may also present a notification (e.g., alarm, pop-up, push notification) that a landmark is approaching.

Figure 3:
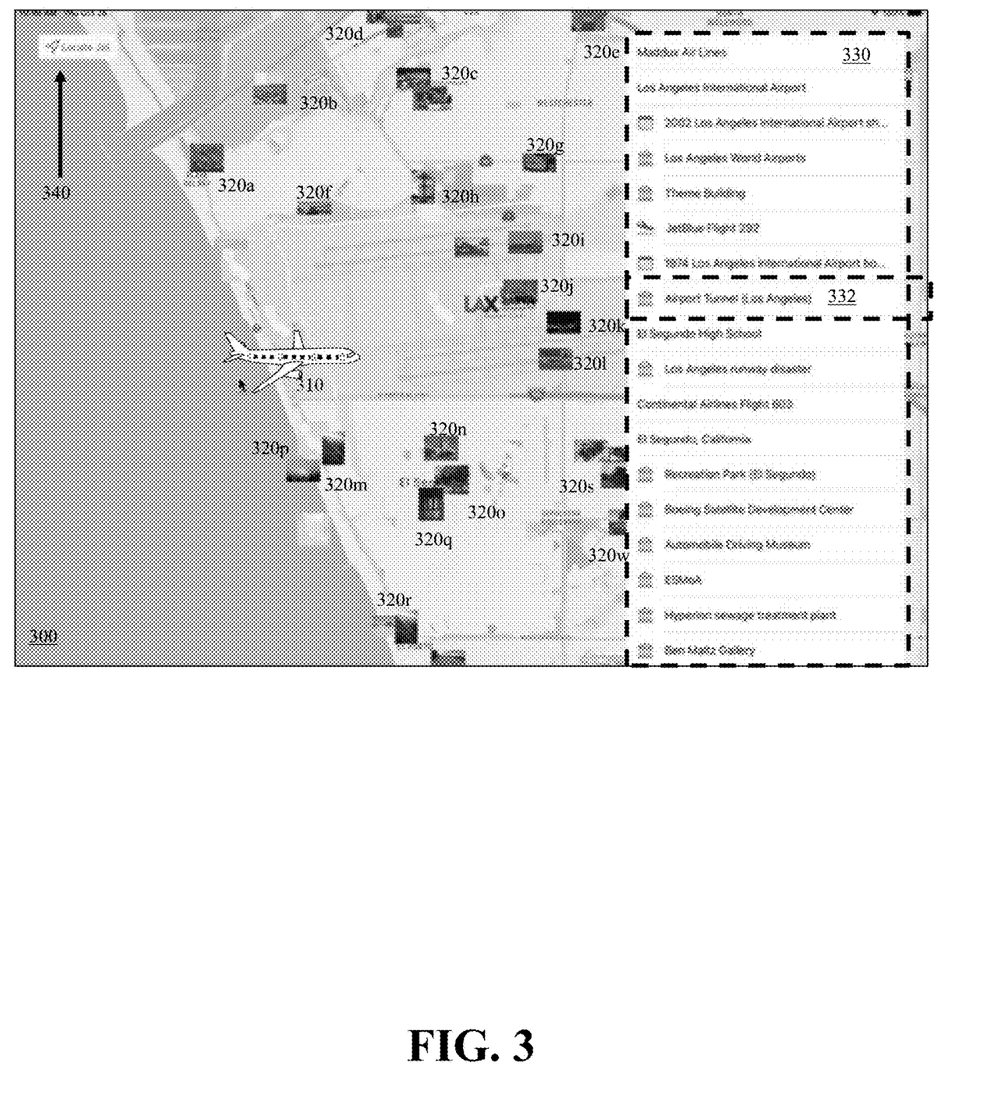
FIGS. 3-7 illustrate various pages presented by a dynamic aircraft-specific GUI generation system, in accordance with different embodiments.

FIG. 3 depicts a page 300 presented by the analytics server that is displayed on a mobile device of a passenger. The passenger may execute an application (e.g., mobile application) that is either provided by or otherwise functionally controlled by the analytics server. As a result, the analytics server presents the page 300 that includes various graphical indicators representing landmarks. The page 300 may include a graphical indicator 310 that depicts the aircraft in which the passenger is located. The graphical indicator 310 may be a generic graphical indicator depicting a generic aircraft. In some embodiments, the analytics server may depict the graphical indicator 310 such that it resembles the actual aircraft in which the passenger is located. In some configurations, the passenger can customize the graphical indicator 310, such as by selecting a particular playing type or changing a color associated with the graphical indicator 310.

The page 300 may also include a map showing various attributes of the physical location near the aircraft depicted and represented by the graphical indicator 310. The analytics server may retrieve a map and display a portion of the map that is relevant to an identified location of the aircraft. For instance, the analytics server may display a radius of 10 miles near the aircraft. The end-user may interact with the map displayed on the page 300 and may zoom in and out and/or drag the map to view different portions of the map. The end-user may also interact with the graphical button 340 and the analytics server may re-center the map on or near the aircraft depicted by the graphical indicator 310.

Using the methods and systems described herein, the analytics server may retrieve a list of landmarks that are within the visibility threshold. As a result, the analytics server may display the graphical indicators 320a-w. As discussed above, the aircraft depicted by the graphical indicator 310 is not in flight, which affects the visibility threshold. Specifically, a passenger may not be able to view any of the landmarks from the aircraft when the aircraft altitude is zero. However, as described above, the end-user may customize the visibility threshold. In the depicted embodiment, the passenger has customized the visibility threshold, such that various landmarks are within the visibility threshold even though the aircraft altitude is zero or near zero. As a result, the analytics server identifies various landmarks and displays a graphical indicator for each landmark that has been identified.

The page 300 may also include the graphical element 330 that provides a textual description for each landmark. When the end-user interacts with each graphical indicator 320, corresponding textual information within the graphical element 330 may be visually distinct. For instance, when the analytics server identifies that the passenger has hovered over the graphical indicator 320j, the analytics server may make the graphical element 332 visually distinct (e.g., the analytics server may change the color of the graphical element 332 or may italicize the words displayed within the graphical element 332).

Figure 4:
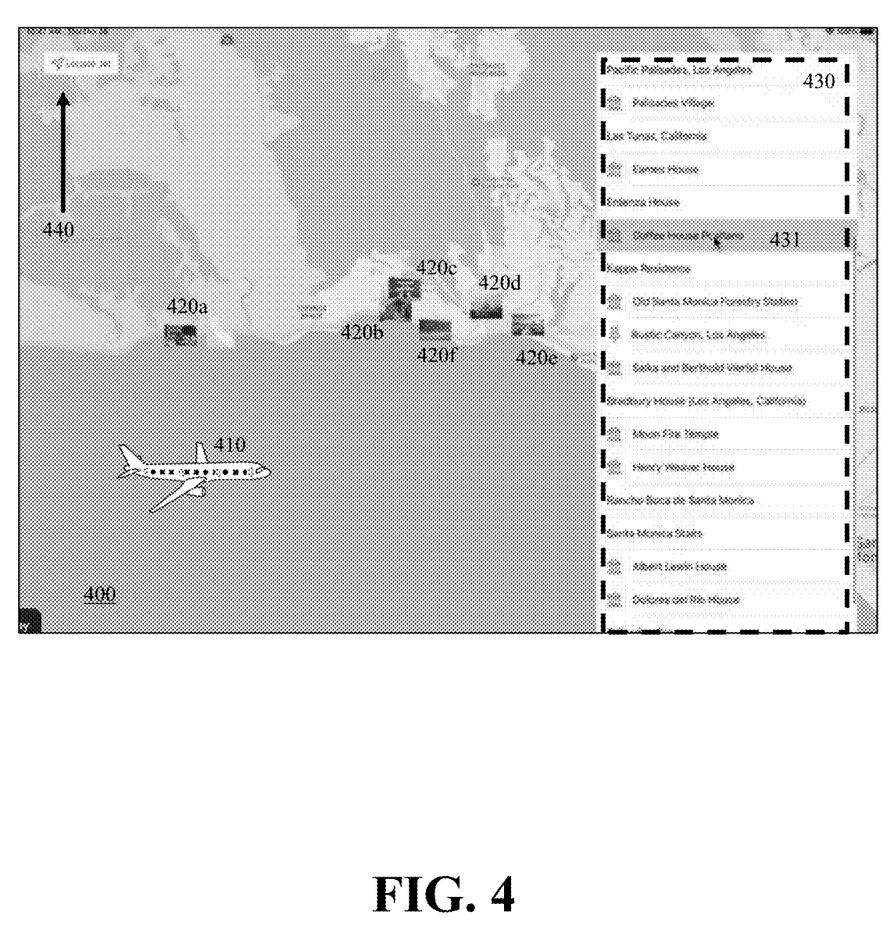

FIG. 4 depicts another embodiment of another page displayed by the analytics server. The page 400 may include a graphical indicator 410 that corresponds to an aircraft in flight. Using the methods and systems described herein, the analytics server may identify six landmarks. Each landmark may be represented by a graphical indicator (e.g., graphical indicators 420a-e or collectively graphical indicators 420). The page 400 may also include the graphical element 430 that includes textual information for various landmarks identified and represented by the graphical indicators 420. The graphical element 430 may be an interactive graphical element. For instance, when the end-user interacts with the graphical element 431 (or when the end-user interacts with a graphical indicator that corresponds to the graphical element 431, such as the graphical indicator 420d), the analytics server may direct the user to the page 500 (depicted in FIG. 5).

The page 500 may include additional information (e.g., text, image(s), or other information) related to a landmark corresponding to the graphical indicator 420d or the graphical element 431. The analytics server may retrieve the additional information from any electronic data source, such as an internal database, a third-party database, or a website. For instance, upon identifying a landmark, the analytics server may query one or more electronic data sources by transmitting an identifier of the landmark (e.g., name or a location of the landmark) to the one or more electronic data sources. In response, the analytics server may receive data associated with the landmark, such as an image and/or text associated with the landmark. Additionally or alternatively, the analytics server may receive video and/or audio files from the one or more electronic data sources. The analytics server may then dynamically populate the page 500 with the data received from the one or more electronic data sources.

The analytics server may use an application programming interface (API) to communicate with the one or more electronic data sources. Utilizing an API may allow for faster communication and more consistent data retrieval, thereby allowing the analytics server to populate the page with additional data in real-time or near real-time.

The page 500 may include additional information associated with the landmark represented by the graphical element 431. For example, when the analytics server identifies that the end-user has interacted with the graphical element 431, the analytics server uses an API to transmit a location and name associated with the graphical element 431 to an online encyclopedia (e.g., Coffee House Positano—Malibu). In response, the analytics server identifies text that describes Coffee House Positano.

In some embodiments, the online encyclopedia may transmit a text file to the analytics server. Alternatively, the analytics server may retrieve the text directly from the online encyclopedia's platform (e.g., by screen scraping the text displayed on a website of the encyclopedia). Using the retrieved text (or at least a portion of the retrieved text, such as the first paragraph), the analytics server then populates the graphical element 510.

The analytics server may monitor the end-user's interactions with the graphical element 510 and may dynamically revise the content accordingly. For instance, the text received from the online encyclopedia may be interactive (e.g., may include hyperlinks). If the analytics server determines that the end-user has interacted with a hyperlink, the analytics server may revise the graphical element 510 using data associated with the activated hyperlink. In some configurations, the analytics server may direct the end-user to the electronic data source itself. For instance, the analytics server may populate the graphical element 510 with the online encyclopedia's website.

As discussed herein, the analytics server may not limit the graphical indicators to landmarks. Additionally or alternatively, the analytics server may display images of interest that are near an aircraft. Referring now to FIG. 6, a page 600 includes a graphical indicator 610 representing an aircraft in flight. The page 600 may also include the graphical indicators 620a and 620b. Each graphical indicator represents an image that was taken at that particular location. The page 600 may also include the graphical element 620. The graphical element 620 may include various interactive texts allowing the passenger to view additional information associated with the flight, towns near the aircraft's current location, destination, and the like.

When the analytics server identifies that the end-user has interacted with the graphical indicator 620a via a computing device, the analytics server directs the user (via the computing device) to the page 700 where that particular image is displayed. Specifically, the image 710 corresponds to an image that was previously captured by the passenger at a location that matches the location of the graphical indicator 620*a*.

The page 700 may also include textual information associated with the picture. For instance, the passenger may have previously annotated the picture or may have added various notes 720. The page 700 may include notes that were previously added by the passenger.

In some configurations, the analytics server may first determine that the image 710 is within a list of images authorized to be viewed by the end-user. In order to ensure that passengers' images are not improperly shared, the analytics server may customize the page 700 to the end-user viewing the page 700. In one embodiment, the analytics server may allow the passenger to upload their images and identify (e.g., tag) authorized users and/or other people who are within each image. For instance, when a passenger takes a picture on a flight (or when the passenger uploads an image), the analytics server may display a prompt on the passenger's electronic device asking for a location associated with the picture, authorized users (e.g., who can view this image, for instance, the passenger may select the name of their family members or friends), and people who are depicted in the picture. The analytics server may use the methods and system discussed herein to display the picture (e.g., image 710). However, the analytics server may examine the image 710 to ensure that it is only displayed for end-users who are tagged in the image 710 and/or otherwise authorized to view the image 710.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, function, procedure, subroutine, subprogram, or the like. When a process corresponds to a function, the process termination may correspond to a return of the function to a calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate the transfer of a computer program from one place to another. A non-transitory processor-readable storage media may be any available media that is accessible by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. "Disk" and "disc", as used herein, include compact disc (CD), laser disc, optical disc, digital versatile disc (DVD), floppy disk, and Blu-ray disc formats, wherein "disks" reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:

continuously monitoring, by a processor, a location of an aircraft during a flight using a sensor on the aircraft;

identifying, by the processor, a trajectory of the aircraft based on the continuous monitoring of the location of the aircraft;
identifying, by the processor, an altitude of the aircraft;
determining, by the processor, one or more first landmarks visible by a passenger through a window from the aircraft based on a visibility threshold, wherein the visibility threshold is based on the identified altitude, location, trajectory of the aircraft, a distance threshold, and at least one attribute of the one or more first landmarks;
wherein the distance threshold corresponds to a type of flight associated with the flight;
determining, by the processor, one or more second landmarks visible by the passenger through the window from the aircraft based on a second altitude;
receiving, by the processor, a selection of at least one of the identified altitude or the second altitude;
responsive to receiving a selection of the identified altitude:
presenting, by the processor, a page having one or more graphical indications of the one or more first landmarks visible by the passenger through the window from the aircraft; and
responsive to receiving a selection of the second altitude:
presenting, by the processor, a page having one or more graphical indications of the one or more second landmarks visible by the passenger through the window from the aircraft based on the second altitude.

2. The method of claim 1, further comprising:
in response to identifying an interaction with a graphical indication within the one or more graphical indications of the one or more first landmarks or the one or more second landmarks, presenting, by the processor, additional data associated with the graphical indication.

3. The method of claim 2, wherein the additional data is an image or a video.

4. The method of claim 2, wherein the additional data is a text file.

5. The method of claim 2, wherein the additional data is an audio file.

6. The method of claim 1, further comprising:
presenting, by the processor on the page, at least one secondary graphical indication corresponding to a media element associated with a location visible from the aircraft based on the identified altitude, location, and trajectory of the aircraft.

7. The method of claim 6, wherein the media element is at least one of an image, a video, or an audio file.

8. The method of claim 6, wherein the location of the media element is stored within metadata of the media element.

9. A computer system comprising:
a server comprising a processor and a non-transitory computer-readable medium containing instructions that when executed by the processor causes the processor to perform operations comprising:
continuously monitoring a location of an aircraft during a flight using a sensor on the aircraft;
identifying a trajectory of the aircraft based on the continuous monitoring of the location of the aircraft;
identifying an altitude of the aircraft;
determining one or more first landmarks visible by a passenger through a window from the aircraft based on a visibility threshold, wherein the visibility threshold is based on the identified altitude, location, trajectory of the aircraft, a distance threshold, and at least one attribute of the one or more first landmarks;
wherein the distance threshold corresponds to a type of flight associated with the flight;
determining one or more second landmarks visible by the passenger through the window from the aircraft based on a second altitude;
receiving a selection of at least one of the identified altitude or the second altitude;
responsive to receiving a selection of the identified altitude:
presenting a page having one or more graphical indications of the one or more first landmarks visible by the passenger through the window from the aircraft; and
responsive to receiving a selection of the second altitude:
presenting a page having one or more graphical indications of the one or more second landmarks visible by the passenger through the window from the aircraft based on the second altitude.

10. The computer system of claim 9, wherein the instructions further cause the processor to, in response to identifying an interaction with a graphical indication within the one or more graphical indications of the one or more first landmarks or the one or more second landmarks, present additional data associated with the graphical indication.

11. The computer system of claim 10, wherein the additional data is an image or a video.

12. The computer system of claim 10, wherein the additional data is a text file.

13. The computer system of claim 10, wherein the additional data is an audio file.

14. The computer system of claim 10, wherein the instructions further cause the processor to present, on the page, at least one secondary graphical indication corresponding to a media element associated with a location visible from the aircraft based on the identified altitude, location, and trajectory of the aircraft.

15. The method of claim 6, wherein the media element is at least one of an image, a video, or an audio file.

16. The method of claim 6, wherein the location of the media element is stored within metadata of the media element.

17. A computer system comprising:
an electronic device configured to present one or more pages, and
a server in communication with the electronic device, the server configured to:
continuously monitor a location of an aircraft during a flight using a sensor on the aircraft;
identify a trajectory of the aircraft based on the continuous monitoring of the location of the aircraft;
identify an altitude of the aircraft;
determine one or more first landmarks visible by a passenger through a window from the aircraft based on a visibility threshold, wherein the visibility threshold is based on the identified altitude, location, trajectory of the aircraft, a distance threshold, and at least one attribute of the one or more first landmarks;
wherein the distance threshold corresponds to a type of flight associated with the flight;
determine one or more second landmarks visible by the passenger through the window from the aircraft based on a second altitude;
receive a selection of at least one of the identified altitude or the second altitude;

responsive to receiving a selection of the identified altitude:
present, on the electronic device, a page having one or more graphical indications of the one or more first landmarks visible by the passenger through the window from the aircraft; and
responsive to receiving a selection of the second altitude:
present, on the electronic device, a page having one or more graphical indications of the one or more second landmarks visible by the passenger through the window from the aircraft based on the second altitude.

18. The computer system of claim 17, wherein the server is further configured to:
in response to identifying an interaction with a graphical indication within the one or more graphical indications of the one or more first landmarks or the one or more second landmarks, present additional data associated with the graphical indication.

19. The computer system of claim 18, wherein the additional data is at least one of a media element, a text file, or an audio file.

20. The computer system of claim 17, wherein the server is further configured to present, on the page, at least one secondary graphical indication corresponding to a media element associated with a location visible from the aircraft based on the identified altitude, location, and trajectory of the aircraft.

* * * * *